(12) United States Patent
Porter

(10) Patent No.: US 6,986,864 B2
(45) Date of Patent: Jan. 17, 2006

(54) POLYESTER COMPOSITIONS

(76) Inventor: David Scott Porter, 3212 Ridgeview St., Kingsport, TN (US) 37664

( * ) Notice: Subject to any disclaimer, the term of this patent is extended or adjusted under 35 U.S.C. 154(b) by 0 days.

(21) Appl. No.: 10/135,628

(22) Filed: Apr. 30, 2002

(65) Prior Publication Data

US 2003/0205852 A1 Nov. 6, 2003

(51) Int. Cl.
*B29C 51/00* (2006.01)
*C08L 67/02* (2006.01)
*C08K 5/49* (2006.01)

(52) U.S. Cl. .................. 264/544; 524/128; 524/139; 524/154; 525/67; 525/166; 525/176; 525/177; 525/544

(58) Field of Classification Search ............... 264/544; 524/128, 139, 154; 525/67, 166, 176, 177, 525/444

See application file for complete search history.

(56) References Cited

U.S. PATENT DOCUMENTS

| | | |
|---|---|---|
| 2,623,031 A | 12/1952 | Snyder |
| 3,023,192 A | 2/1962 | Shivers |
| 3,496,143 A | 2/1970 | Siggel et al. |
| 3,651,014 A | 3/1972 | Witsiepe |
| 3,663,653 A | 5/1972 | Frohlich et al. |
| 3,763,109 A | 10/1973 | Witsiepe |
| 3,766,146 A | 10/1973 | Witsiepe |
| 3,896,078 A | 7/1975 | Hoeschele |
| 3,960,807 A | 6/1976 | McTaggart |
| 4,013,624 A | 3/1977 | Hoeschele |
| 4,088,709 A | 5/1978 | Seymour et al. |
| 4,172,859 A | 10/1979 | Epstein |
| 4,264,761 A | 4/1981 | McGirk |
| 4,284,540 A | 8/1981 | Iida et al. |
| 4,322,335 A | 3/1982 | Nield |
| 4,357,268 A | 11/1982 | Vanderkooi, Jr. et al. |
| 4,383,106 A | 5/1983 | Tung |
| 4,390,687 A | 6/1983 | Tung |
| 4,448,913 A | 5/1984 | Coleman et al. |
| 4,463,121 A | 7/1984 | Gartland et al. |
| 4,476,274 A | 10/1984 | Liu |
| 4,548,978 A | 10/1985 | Garrison, Jr. |
| 4,572,852 A | 2/1986 | Gartland et al. |
| 4,713,268 A | 12/1987 | Carson |
| 4,753,980 A | 6/1988 | Deyrup |
| 4,996,269 A | 2/1991 | Richeson et al. |
| 5,102,943 A | 4/1992 | Logullo |
| 5,322,663 A | 6/1994 | Lai et al. |
| 5,344,912 A * | 9/1994 | Dalgewicz, III .......... 528/308.1 |
| 5,382,628 A | 1/1995 | Stewart et al. |
| 5,405,921 A | 4/1995 | Muschiatti et al. |
| 5,458,978 A | 10/1995 | Böttcher et al. |
| 5,541,244 A | 7/1996 | van der Meer et al. |
| 5,567,758 A | 10/1996 | Kinami et al. |
| 5,646,208 A | 7/1997 | Cattron et al. |

FOREIGN PATENT DOCUMENTS

| | | |
|---|---|---|
| FR | 2801599 A | 6/2001 |
| RU | 2040404 C1 | 7/1995 |
| RU | 94026253 A1 | 5/1996 |
| RU | 94045269 A1 | 8/1996 |
| RU | 2073056 C1 | 7/1997 |
| RU | 2088616 C1 | 8/1997 |
| WO | WO 85/03718 | 8/1985 |
| WO | WO 93/15146 | 8/1993 |
| ZA | 317213 | 7/1971 |
| ZA | 522194 | 7/1976 |

OTHER PUBLICATIONS

Gachter and Miller, Plastics Additives, Chapter 17, Hanser Publications, 1992.
D.W. Van Krevelen, Chimia, 32, (1978), p. 279.
Misra et al., Journal of Polymer Science, Polymer Physics Edition, 24, (1986), p. 983.
Research Disclosure: 30655, "Hisnly Crystallizable Polyester Blend" Oct. 1989.
Communication Relating to the Results of the Partial International Search.

* cited by examiner

*Primary Examiner*—Jeffrey B. Robertson
(74) *Attorney, Agent, or Firm*—Dennis V. Carmen; Bernard J. Graves, Jr.

(57) ABSTRACT

Disclosed are certain novel polyester compositions particularly useful for shaping or forming into containers and similar shaped articles by thermoforming procedures. The polyester compositions comprise a thermoplastic polyester, an impact modifier and a polyester crystallization rate enhancing component selected from poly(tetramethylene terephthalate) homo- and co-polymers. The polyester compositions exhibit improved crystallization rates as compared to similar compositions not including impact modifier or compositions using other types of crystallization rate enhancing components such as polyolefin-based polymers.

9 Claims, No Drawings

POLYESTER COMPOSITIONS

FIELD OF THE INVENTION

This invention pertains to certain novel polyester compositions which are particularly useful for shaping or forming into containers and similar shaped articles by thermoforming procedures. More specifically, this invention pertains to novel polyester compositions comprising a thermoplastic polyester, an impact modifier and a polyester crystallization rate enhancing component selected from poly(tetra-methylene terephthalate) homo- and co-polymers. The polyester compositions exhibit improved crystallization rates as compared to similar compositions not including impact modifier or compositions using other types of crystallization rate enhancing components such as polyolefin-based polymers.

BACKGROUND OF THE INVENTION

Poly(ethylene terephthalate) (PET) is widely used as an extrusion and injection-molding resin for the fabrication of various articles for household or industrial use, including appliance parts, containers, and auto parts. PET also is commonly extruded into sheet (including film) of various thicknesses, which may be used as-fabricated or shaped, e.g., by thermoforming, into articles such as display articles, signs, or packaging articles. For example, extruded PET sheet material can be used to make trays, packages or containers in which foods may be both stored and heated and/or cooked. As used herein, the terms "tray" and "trays" include packages and containers in which food is packaged and sold for subsequent heating and/or cooking while still in the tray, package or container. Food trays fabricated from crystallized PET (CPET) retain good dimensional stability over the range of temperatures commonly encountered during both microwave and conventional oven cooking (known as dual ovenable).

The manufacture of thin-walled containers (trays) using the thermoforming process is well-known in the art. Such polyester food trays typically are manufactured by first extruding a sheet of polyester, then thermoforming the tray in a heated mold. Specific processes for extruding polyester sheeting and thermoforming the sheet material to produce CPET food trays are also well known, for example, as described by Siggel et al. in U.S. Pat. No. 3,496,143. The thermoforming process both forms the shape of the tray and crystallizes the polyester resin. The manufacture of this type of polyester article requires that it be initially formed from substantially amorphous polyester sheet. Crystallization is then accomplished by means of holding the polyester at a temperature between its glass transition temperature ($T_g$) and the crystalline melting temperature ($T_m$) while in the mold. Crystallization of the sheet in its final shape produces the desired high temperature stability of the thermoformed article. The sheet material used may be prepared in a process separate from the thermoforming process (sometimes referred to as the roll-fed or in-line process) which uses sheet heated from below the glass transition temperature. Alternatively, the sheet material may be prepared in-line with the thermoforming process such that the melt may not vitrify or vitrify completely before contact with the mold (sometimes referred to as the melt-to-mold process).

Unmodified PET crystallizes slowly when cooled from the melt or heated from below the glass transition temperature. To obtain acceptable manufacturing economics, it is necessary that the rate of thermal crystallization be rapid. A well-known method to increase the rate of crystallization is to incorporate a crystallization nucleator into the polyester. These crystallization rate enhancers typically are inorganic or organic solids finely dispersed throughout the polyester. Such nucleators typically are used at a concentration, relative to the polyester being nucleated, of at least 0.05% by weight. The great majority of prior art that attempts to increase the crystallization rate of polyester articles is concerned with crystallization during cooling of the polymer, especially in injection molding processes. In crystallization during cooling of the polymer from the melt, one measure of improvement of the crystallization characteristics is an increase in the temperature at onset of crystallization. One characteristic of typical crystallization nucleators well-known in the art, such as talc, is that they promote crystallization during cooling from the melt as well as during heating from below the glass transition temperature. For example, an article injection molded from typical nucleated polyester crystallizes to at least some degree while in the injection mold. This is desirable if the object is to produce a crystalline injection molded part. If, however, the object is to produce an amorphous part, such as an extruded sheet, crystallization from the melt is objectionable because it may interfere with subsequent operations, such as thermoforming. The best additives for enhancing the processing of thermoforming heat-stable, crystalline parts by thermoforming therefore are those that will enhance crystallization on heating from below the glass transition temperature, and ideally have little or no enhancement (or even supression) of crystallization rate when cooling from the melt.

Fast crystallization rates are not the only consideration for successful implementation of CPET for food containers, however. One problem encountered with polyester food trays is that they can suffer from poor impact properties, especially at low temperatures. The impact properties of food trays may be affected detrimentally by the presence of some nucleating agents, especially inorganic nucleating agents. One way to improve the impact properties (toughness) of these articles is to use high molecular weight polyester in the fabrication of the tray. Therefore, polyester used in food trays often is specially manufactured to produce intrinsic viscosities (IVs) of about 0.90 to about 1.05 dL/g. Another approach is to add an impact modifier to the polyester composition. In general, trays are toughest when both approaches are utilized. The presence of majority amounts of polyester in the composition provides the other necessary properties such as tensile strength, stiffness and temperature resistance. Of the impact modifiers used in polyester compositions, terpolymers based on ethylene, an alkyl acrylate and glycidyl acrylate, or blends of similar polymers provide an attractive combination of properties in this application, e.g., as disclosed by Epstein in U.S. Pat. No. 4,172,859 and Deyrup in Published PCT Application WO 85/03718, though other impact modifying agents may be used.

The crystallization rate of PET and other polyesters has been increased through the use of additives. See, for example, Gachter and Miller, in Plastics Additives, Chapter 17, Hanser Publications, 1992. Several different mechanisms have been proposed to explain the activity of these additives. In the majority of cases wherein an additive is included in a polyester, the objective is to improve the crystallization rate as the melt is cooled, which is especially significant for injection molding applications. The difference in the crystallization rate of polymers, depending upon whether they are heated from below the glass transition temperature to the crystallization temperature or are cooled from the melt to the crystallization temperature, has been described by D. W. van Krevelen, *Chimia*, 32, (1978), p. 279. This reference describes large differences in the nucleation density depending upon thermal history. Little prior art exists specifically outlining the improvement of crystallization rate on heating from the glass rather than cooling from the melt. Polymers that quickly crystallize from the glass while crystallizing relatively slowly from the melt are advantageous for the thermoforming process.

Polyester compositions suitable for thermoforming in short cycle times are described by Muschiatti et al., U.S. Pat. No. 5,405,921. The nucleating agents used by by Muschiatti et al. are comprised of metal salts of polyesters, preferably formed before contact with the polyester. These compositions are claimed to be useful for thermoforming. Kinami et al., U.S. Pat. No. 5,567,758, claim polyester compositions with specific endgroup chemistry together with inorganic compounds that produce moldings that crystallize quickly at low temperatures. Logullo, U.S. Pat. No. 5,102,943, discloses thermoformed tray compositions containing a small amount of sodium ion and wax. The Logulo patent describes good crystallization rates due to inclusion of the sodium ion and good trimming and stacking properties due to inclusion of the wax.

Research Disclosure 30655 (October 1989) describes a highly crystallizable polyester blend, which contains poly (butylene terephthalate), a copolyetherester, or nylon 6,6 to reduce the induction time of the crystallization process. Richeson et al., U.S. Pat. No. 4,996,269, describe a polyester composition suitable for thermoforming thin walled articles wherein the composition consists of poly(ethylene naphthalate) and from 1 to 6 weight percent of a polyester elastomer. The difference in temperature between the crystallization peak and melting peak was increased due to the presence of the polyester elastomer.

There have also been many reports of the use of poly (oxytetramethylene)diol as a nucleating additive for PET. As early as 1972, there were reports in the patent literature, e.g., U.S. Pat. No. 3,663,653, of the copolymerization of poly (oxytetramethylene)diol in PET for the purpose of increasing crystallization rate. Nield, U.S. Pat. No. 4,322,335, describes a polyester composition containing a block copolyester with a "crystallizaton nucleant" consisting of an ethylene-based ionomer. The block copolyester is described as consisting of ethylene terephthalate units and polymeric units having a glass transition temperature of less than 0° C., including polyethers such as polyethylene glycol, polypropylene glycol, polytetramethylene glycol, and polydecamethylene glycol and polyesters such as poly(ethylene adipate), poly(tetramethylene adipate), polycaprolactone, poly(ethylene sebacate), poly(ethylene azelate), and poly (oxy-diethylene sebacate). In addition, Garrison, U.S. Pat. No. 4,548,978, describes multi-component nucleating systems for PET, consisting of poly(oxyalkylene)diols, though most of the Garrison's focus is on poly(oxyethylene)diol. Garrison describes a complementary effect for the use of polyalkylene glycols with plasticizers. The formulations of the '978 patent also contain a "crystallization promoter" consisting of organic ionic hydrocarbon copolymers.

The use of poly(tetramethylene terephthalate), also known as polybutylene terepthalate or PBT, as a nucleating agent in PET was investigated by Misra et al., *Journal of Polymer Science*, Polymer Physics Edition, 24, (1986), page 983. The authors prepared PET/PBT block copolymers with a small fraction of the total copolymer consisting of the PBT. At concentrations less than 3.5% PBT, the crystallization rate (measured at 95° C.) increased, though for higher concentrations than this the crystallization rate again decreased, the rates remained higher than unmodified PET. This effect was attributed to an entropy reduction for the PET chains when the PBT blocks crystallize, which in turn lowers the free energy for crystallization of the PET. This effect was not observed for random PET/PBT copolymers.

None of the prior art publications cited above address the improvement of impact resistance of the polyester or the desirability of enhancing crystallization rate only from the glass, and not during cooling from the melt.

Many publications describe the use of additives to improve the toughness of polyester compositions, and the use of modified polyolefin copolymers as impact modifiers for polyesters is well-known. Epstein, U.S. Pat. No. 4,172,859, discloses multiphase thermoplastic compositions where one phase contains 60–99 weight percent of a polyester matrix resin, and the remaining phase or phases contains a random copolymer. This copolymer is adhered to the matrix resin, and has a tensile modulus of 0.07 to 1378 bar (1.0–20,000 psi), or less than 1/10th that of the matrix resin. Among the random copolymers disclosed and exemplified by Epstein in such compositions are poly(ethylene/methyl acrylate/glycidyl methacrylate) and poly(ethylene/vinyl acetate/glycidyl methacrylate). These compositions provide enhanced toughness as compared to unmodified polyester polymers.

Published PCT Application WO 93/15146 discloses the use of various non-functionalized poly(alkyl acrylates) to toughen food trays made from CPET. These poly(alkyl acrylate) materials may be used alone or in combination with an acrylic core-shell impact modifier. U.S. Pat. No. 5,382,628 discloses the use of polyester or copolyester additives made from 1,4-cyclohexanedimethanol to toughen crystalline PET food trays. No improvements in crystallization rate or methods to improve the crystallization rate together with improvement of the impact performance are presented in these disclosures.

The use of impact modifying additives together with additives that improve the crystallization rate also is known. U.S. Pat. No. 4,713,268 discloses that the toughness of food trays when impacted at −18° C. (0° F.) is greatly improved by the addition of a core-shell impact modifier. These impact modifiers are produced by polymerization of monomers that yield a rubbery polymer upon polymerization and an alkyl methacrylate shell. The system described in the '268 patent also includes 1–5 weight percent aromatic polyester crystallization rate enhancer (with PBT being preferred) and 0–14.5 weight percent aromatic polycarbonate. U.S. Pat. No. 5,322,663 discloses that ethylene/methyl acrylate, ethylene/ethyl acrylate and ethylene/vinyl acetate copolymers may be used instead of linear low density polyethylene (LLDPE) as a nucleating agent in order to overcome plate-out problems associated with the use of LLDPE. The '663 patent does not provide any evidence regarding the effectiveness of these copolymers as nucleating agents. The '663 patent also teaches that these copolymers are effective impact modifiers at ambient (room) temperature but are not effective as impact modifiers at low temperatures. The '663 patent suggests that additional benefits would be derived by augmenting these impact modifying additives with those described in the '268 patent to improve low temperature performance.

U.S. Pat. No. 3,960,807 discloses the use of a "crack stopping agent" to improve the toughness of CPET trays. The crack stopping agent may be a polyolefin or other thermoplastic material present in concentrations of 2–16 weight percent. The tray compositions of U.S. Pat. No. 3,960,807 also contain 0.01–20 weight percent of an inorganic nucleating agent. U.S. Pat. Nos. 4,463,121 and 4,572,852 disclose that the inorganic nucleating agent employed in the compositions of the '807 patent are unnecessary and that the polyolefin also can serve as a nucleating agent. These patents also disclose that various crystallization aids often are added to the PET during the extrusion of the sheet material to control the crystallization rate of the PET.

Other poly(ethylene terephthalate) compositions containing tougheners and nucleating agents have been described previously. For example, in U.S. Pat. No. 4,357,268, Vanderkooi describes specific nucleating agents of acid salts that may optionally include impact modifiers. Coleman et al. in U.S. Pat. No. 4,448,913 describe polyester compositions optionally containing copolyetheresters. In these compositions, sodium benzoate is always present, and this may be assumed to be the nucleating agent, as the copolyesterether is specified as an additive to improve impact performance. Carson, U.S. Pat. No. 4,713,268, describes the use of core-shell impact modifiers comprised of an elastomeric phase composed of monomers that provide a rubbery polymer upon polymerization together with nucleating agents. These are used in conjunction with from 1 to 5% of a poly(alkylene terephthalate) crystallization rate accelerator, with the poly(alkylene terephthalate) having an alkylene group containing between 4 and 6 carbons including PBT. This patent does not disclose any unexpected benefit in crystallization rate due to the introduction of polyester with preformed core-shell impact modifiers, and does not discuss the use of PBT or copolyetheresters of PBT to increase crystallization rate with impact modifiers that do not consist of preformed particles.

U.S. Pat. No. 4,284,540 describes the use of ethylene/glycidyl methacrylate (GMA) copolymers as a toughening agent for polyesters when combined with 0.1 to 5 weight percent of a barium salt of a fatty acid. These barium salts are reported to broaden the window of crystallization temperature for injection molding applications. U.S. Pat. No. 4,753,980 discloses that polyester compositions containing 3 to 40 weight percent of either ethylene/ethyl acrylate/GMA terpolymer or ethylene/butyl acrylate/GMA terpolymer possess superior low temperature toughness when compared to analogous polyester compositions which contain an ethylene/methyl acrylate/GMA terpolymer. These compositions also may contain carboxylic acid crystallization rate enhancers with sources of sodium or potassium ion.

Published PCT Application WO 85/03718 discloses compositions containing ethylene/alkyl acrylate/glycidyl acrylate toughener additives. This publication discloses specifically acrylate copolymers with an ester substituent having an alkyl chain of from 2 to 8 carbon atoms, which does not include methyl acrylate copolymers. Compositions also are disclosed which include additional ingredients, including plasticizer or polyalkylene oxide "soft segments", as well as a crystallization promoter. The amount of plasticizer and poly(oxyalkylene) "soft segments" together is at least 9% by weight of the matrix resin, and the ratio of soft segment and plasticizer can vary between 85:15 to 15:85. The addition of poly(oxyalkylene) "soft segments" together with toughener and 2–8% glass fibers demonstrated good impact performance, and were especially suited for certain end uses. No suggestion is made of the effect of poly(oxyalkylene) for crystallization rate improvement, and no synergistic effect for crystallization rate is suggested between the additives and the impact modifier.

Polyesters modified with polyolefin-based impact modifiers are known in the literature, but are not described in combination with the specific polyester or polyester copolymer additives of the present invention as having good impact performance as well as unexpectedly high crystallization rate.

BRIEF SUMMARY OF THE INVENTION

The present invention provides polyester compositions which exhibit good impact performance as well as unexpectedly high crystallization rates. The novel polyester compositions of my invention comprise:

I. about 60 to 97.9 weight percent of a thermoplastic polyester comprised of:
  (A) diacid residues comprising at least 85 mole percent terephthalic acid residues or 2,6-naphthalenedicarboxylic acid residues;
  (B) diol residues comprising at least 85 mole percent ethylene glycol residues or 1,4-cyclohexanedimethanol residues; wherein the polyester is made up of 100 mole percent diacid residues and 100 mole percent diol residues;

II. about 25 to 2 weight percent of an impact modifying polymer derived from one or more ethylenically unsaturated monomers and comprising at least 30 mole percent ethylene residues, propylene residues or a mixture thereof; and III. about 0.1 to 10 weight percent of a polyester crystallization rate enhancer comprised of:
  (A) diacid residues comprising at least 85 mole percent terephthalic acid residues or a mixture of terephthalic acid and isophthalic acid residues;
  (B) diol residues comprising at least 85 mole percent of (i) 1,4-butanediol residues or (ii) a mixture of 1,4-butanediol residues and poly(oxyalkylene) or polyalkylene residues wherein the poly(oxyalkylene) and polyalkylene residues are derived from polyalkylenediols or poly(oxyalkylene)diols having a molecular weight of about 300 to 8000; wherein polyester III is made up of 100 mole percent diacid residues and 100 mole percent diol residues;

wherein the weight percentages of I, II and III are based on the total weight of components I, II and III. The total of the weight percentages of I, II and III equals 100 weight percent. These compositions are useful for, but not limited to, thermoformed plastic articles such as frozen food trays.

It has been discovered that there is a negative effect on crystallization rate of polyester molding compositions containing a polyolefin nucleating (or crystallization rate enhancing) agent and polyolefin impact modifier, which may be overcome through the use of the alternative crystallization rate enhancing additives according to the present invention. These alternative materials provide unexpectedly fast crystallization rates when used with the impact modifying additives of interest, thus allowing fast processing of trays with good impact performance. This improved crystallization rate created by the addition of both components is greater than the crystallization rate of either additive component alone.

The fast crystallization rates exhibited by the above described polyester compositions render the compositions particularly useful in the manufacture of trays and other shaped articles by the thermoforming method of molding. Thus, a second embodiment of the present invention provides a method for the manufacture of a shaped article by the thermoforming method which comprises the steps of:

(1) providing a sheet of one of the polyester compositions defined above having a temperature of about 125 to 165° C.;

(2) positioning the sheet of step (1) over the opening of a mold having a surface temperature of about 120 to 180° C.;

(3) causing the sheet of step (1) to conform to the shape of the mold to form a shaped article;

(4) retaining the shaped article within the mold to induce crystallization of the polyester composition; and (5) removing the shaped article from the mold.

DETAILED DESCRIPTION

Thermoplastic polyester component I of my novel compositions makes up from about 60 to 97.9 weight percent of the polyester compositions, and preferably from about 80 to 95 weight percent. These polyesters are commercially available and/or may be prepared by batch or continuous processes using conventional melt phase or melt phase and solid state condensation procedures and catalysts known in the art. The polyester component also may be obtained from post consumer waste, e.g., recycled polyester.

Polyester component I is comprised of diacid residues comprising at least 85 mole percent terephthalic acid residues or 2,6-naphthalenedicarboxylic acid residues and diol residues comprising at least 85 mole percent ethylene glycol residues, or 1,4-cyclohexanedimethanol residues (cis, trans, or cis/trans mixtures); wherein the polyester is made up of 100 mole percent diacid residues and 100 mole percent diol residues. Up to 15 mole percent of the diacid component of the polyesters may be derived from diacids other than terephthalic and/or 2,6-naphthalenedicarboxylic acid residues. For example, up to 15 mole percent of the diacid residues may be residues derived from dicarboxylic acids containing about 4 to 40 carbon atoms such as succinic, glutaric, adipic, pimelic, suberic, azelic, sebacic, isophthalic, sulfodibenzoic, sulphoisophthalic, maleic, fumaric, 1,4-cyclohexanedicarboxylic (cis-, trans-, or cis/trans mixtures), and the like. The diacid residues may be derived from the dicarboxylic acids, esters and acid chlorides thereof, and, in some cases, anhydrides thereof.

Similarly, up to 15 mole percent of the diol residues may be derived from diols other than ethylene glycol or 1,4-cyclohexanedimethanol. Examples of other diols which may be used in the preparation of the polyester component include those containing 2 to about 10 carbon atoms such as ethylene glycol, propylene glycol, 1,3-propanediol, 1,4-butanediol, 1,6-hexanediol, 1,8-octanediol, neopentyl glycol, 2,2,4,4-tetramethyl-1,3-cyclobutanediol, diethylene glycol, and the like. Small amounts, e.g., up to 2 mole percent, of a branching agent such as trimellitic anhydride, pyromellitic dianhydride, glycerol, pentaerythritol, polyvinyl alcohol, styrene-maleic anhydride (SMA) and the like may be included in the polyester if desired.

The polyester component of the compositions of the present invention should have an intrinisic viscosity (IV) in the range of about 0.4 to about 1.4 dL/g, preferably about 0.55 to 1.0 dL/g. The intrinsic viscosities (IVs) referred to herein are measured at 25° C. in a solvent consisting of 60 weight percent phenol and 40 weight percent tetrachloroethane. The polyester component preferably is unmodified PET having an IV of about 0.55 to 1.0 dL/g.

The second component of the polyester compositions of the present invention is an impact modifying polymer, copolymer or polymer blend of a polyolefin-based polymer comprised of at least about 30 mole percent ethylene residues, propylene residues or a mixture thereof. Optionally, up to 90% by weight of this impact modifying additive may consist of preformed rubber particles together with a polyolefin-based polymer, copolymer or polymer blend. While this component may be elastomeric, it has been found previously that thermoplastic polymers which are not elastomeric also can improve toughness in such a composition. This impact modifying component may be formed from polymers or copolymers, and/or blends of polymers or copolymers within the framework of the claimed composition.

Branched and straight chain polymers useful as the impact modifier phase of the composition are represented by the formula

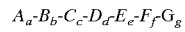

$$A_a\text{-}B_b\text{-}C_c\text{-}D_d\text{-}E_e\text{-}F_f\text{-}G_g$$

wherein

A represents residues derived from ethylene, propylene or a mixture of ethylene and propylene;

B represents carbon monoxide;

C represents residues derived from an unsaturated monomer selected from $\alpha,\beta$-ethylenically unsaturated carboxylic acids having from 3 to 8 carbon atoms and derivatives there of selected from monoesters of alcohols having 1 to 30 carbon atoms and dicarboxylic acids and anhydrides of dicarboxylic acids and metal salts of monocarboxylic, dicarboxylic and monoesters of dicarboxylic acids having from 0 to 100 percent of the carboxylic acid groups ionized by neutralization with metal ions and dicarboxylic acids and monoesters of dicarboxylic acids neutralized by amine-ended caprolactam oligomers having a degree of polymerization of 6 to 24;

D represents residues derived from an ethylenically unsaturated epoxide containing 4 to 11 carbon atoms;

E represents residues derived from an ethylenically unsaturated monomer selected from acrylate esters having 4 to 22 carbon atoms, vinyl esters of acids having from 1 to 20 carbon atoms, vinyl ethers having 3 to 20 carbon atoms, and vinyl and vinylidene halides, and nitrites having from 3 to 6 carbon atoms;

F represents residues derived from an ethylenically unsaturated having pendant hydrocarbon chains of 2 to 12 carbon atoms capable of being grafted with monomers having at least one reactive group of the type defined in C and D, and pendant aromatic groups which may have 1 to 6 substituent groups having a total of 14 carbon atoms;

G represents residues derived from an ethylenically unsaturated monomer selected from the class consisting of branched, straight chain and cyclic compounds having from 4 to 14 carbon atoms and at least one additional nonconjugated unsaturated carbon-carbon bond capable of being grafted with a monomer having at least one reactive group of the type defined in C and D;

and a=30 to 100 mole percent, b=0 to 30 mole percent, c=0 to 50 mole percent, d=0 to 50 mole percent; wherein units or residues A, B, C, D, E, F and G may be present in any order and the impact modifier polymer contains at least 30 mole percent ethylene residues, propylene residues or a mixture thereof.

Examples of the $\alpha,\beta$-ethylenically unsaturated carboxylic acids and alkyl esters of $\alpha,\beta$-ethylenically unsaturated carboxylic acids represented by C include acrylic, methacrylic and ethacrylic acids and alkyl esters thereof wherein the alkyl radical contains from 1 to 20 carbon atoms. Examples of ethylenically unsaturated dicarboxylic acids and metal salts of the monocarboxylic, dicarboxylic acids and the monoester of the dicarboxylic acid and neutralized derivatives thereof include, maleic acid, maleic anhydride, maleic acid monoethyl ester, metal salts of acid monoethyl ester, fumaric acid, fumaric acid monoethyl ester, itaconic acid, vinyl benzoic acid, vinyl phthalic acid, metal salts of fumaric acid monoalkyll ester, monoalkyl esters of maleic, fumaric, itaconic acids wherein the alkyl group contains from 1 to 20 carbon atoms. The carboxyl groups of such acids may be neutralized by amine-ended caprolactam oligomers having a degree of polymerization of 6 to 24. Examples of the vinyl ethers, vinyl esters, vinyl and vinylidene halides and ethylenically unsaturated alkylnitriles include vinyl alkyl ethers wherein the alkyl group contains 1 to 20 carbon atoms, vinyl benzoate, vinyl naphthoate, vinyl chloride, vinylidene fluoride, and acrylonitrile. Examples of the unsaturated epoxides having 4 to 11 carbon atoms include glycidyl methacrylate, glycidyl acrylate, allyl glycidyl ether, vinyl glycidyl ether, glycidyl itaconate, 3,4-epoxy-1-butene, and the like. Illustrative examples of monomers from which residues F may be obtained are styrene, isobutylene, vinyl naphthalene, vinyl pyridine, vinyl pyrrolidone, mono-, di-, and trichlorostyrene, R'-styrene where R' is 1 to 10 carbon atoms, butene, octene, decene, etc., and the like. Illustrative examples of monomers from which residues G may be obtained include butadiene, hexadiene, norbornadiene, isoprene, divinyl, allyl styrene, and the like.

The impact modifier preferably comprises about 0.5 to 20 weight percent of epoxy-containing residues derived from monomers selected from glycidyl methacrylate, glycidyl acrylate, allyl gycidyl ether, 3,4-epoxy-1-butene, or a mixture of any two or more of such monomers. These epoxy-containing monomers may be introduced into the impact modifier during polymerization, or they may be subsequently grafted onto the impact modifier. Such epoxy-containing, impact modifier polymers are well-known in the art and are available from a plurality of manufacturers.

Impact modifiers that may be modified with a functional epoxy group include, but are not restricted to, polyethylene; polypropylene; polybutene; ethylene based copolymers and terpolymers containing vinyl acetate, alkyl acrylate, alkyl methacrylate where the alkyl group could be methyl, ethyl, butyl or ethylhexyl; ethylene-propylene copolymers (EPR); ethylene-propylene-diene (EPDM); natural rubber; polybutadiene; polyisoprene; acrylonitrile-butadiene (nitrile rubber); styrene-butadiene (SBR); styrene-butadiene-styrene (SBS); styrene-ethylene-butene-styrene (SEBS); acrylonitrile-butadiene-styrene (ABS); methyl methacrylate-butyl acrylate (acrylic core-shell); methyl methacrylate-butadiene-styrene (MBS core-shell); or combinations thereof. Of these materials, those based on polyethylene are preferred.

A preferred group of epoxy-containing impact modifiers include copolymers and terpolymers having the respective general formulas E/Y and E/X/Y wherein:

X represents residues derived from

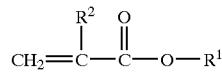

wherein $R^1$ is alkyl of up to about 8 carbon atoms, preferably alkyl of 1 to 4 carbon atoms, and $R^2$ is hydrogen, methyl or ethyl, preferably hydrogen or methyl, and X constitutes about 10 to 40 weight percent, preferably 15 to 35 weight percent, and most preferably 20 to 35 weight percent, of terpolymer E/X/Y;

Y represents residues derived from glycidyl methacrylate, glycidyl acrylate, allyl glycidyl ether and 3,4-epoxy-1-butene which constitute about 0.5 to 20 weight percent, preferably about 2 to 10 weight percent, of copolymer E/Y and terpolymer E/X/Y; and E represents ethylene residues that constitute the remainder of the composition.

The impact modifier also may comprise a blend or mixture of copolymers E/Y, E/X or E/X/Y terpolymer, and optionally, a polyethylene or polypropylene polymer.

Of these, copolymers based on ethylene-glycidyl methacrylate (GMA) (E/GMA) containing about 2 to 10 weight percent GMA residues, and terpolymers based on ethylene-methyl acrylate-GMA, ethylene-ethyl acrylate-GMA and ethylene-butyl acrylate-GMA containing about 20 to 35 weight percent alkyl acrylate residues and about 2 to 10 weight percent GMA residues are particularly preferred. The concentration of the epoxy-containing impact modifiers in the compositions of the present invention preferably is about 10 to 25 weight percent, based on the total weight of components I, II and III.

Optionally, up to 90% of impact modifying component II may consist of preformed elastomeric particles such as a core-shell rubber. This core-shell impact modifier may consist of:

(A) a core-shell polymer comprising about 25 to about 95 wt. % of a first elastomeric phase polymerized from a monomer system comprising about 75 to 99.8% by weight $C_1$ to $C_6$ alkyl acrylate, 0.1 to 5% by weight crosslinking monomer, and 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and about 75 to 5 weight percent of a final, rigid thermoplastic phase polymerized in the presence of said elastomeric phase. This final layer may contain chemical species that react with the matrix resin to improve adhesion to the matrix; and (B) a butadiene based core-shell polymer formed between a butadiene polymer where butadiene units account for at least 50 mole percent of the total polymer and at least one vinyl monomer.

These preformed particles may be of either unimodal or multimodal size distribution. One example of an impact modifier of the core-shell type useful in the present invention is available from Rohm and Haas under the tradename Paraloid EXL-5375. Similar preformed rubber particles or mixtures of various types of preformed particles may also be used.

Any of these embodiments of Component II may be added using procedures well known in the art, such as compounding extrusion, either fed from a separate stream, or precompounded with other additives described in this invention.

The third component of the compositions of the present invention is a polyester polymer that enhances the crystallization rate when the composition containing the component II impact modifier is heated from below the glass transition temperature. The crystallization rate enhancing polyester may comprise about 0.1 to 10 weight percent, preferably from about 0.5 to 5 weight percent, of the total weight of components I, II and III. Component III is a polyester selected from poly(tetra-methylene terephthalate) or poly(tetramethylene terephthalate) copolymerized with a polyalkylene or polyoxyalkylene "soft segment". These particular polyesters have been found to work synergistically with the specified impact modifier compositions to produce fast crystallization rates. Polyesters containing polyoxyalkylene prepolymer "soft segments" are well-known copolyetheresters, commonly used as elastomers, and are comprised of diacid residues comprising terephthalic acid residues, mixed terephthalic/isophthalic acid residues, e.g., containing up to about 50 mole percent isophthalic acid residues, and the like, and diol residues comprising residues of 1,4-butanediol or residues of 1,4-butanediol in combination with polyalkylene diol and/or polyoxyalkylene diol residues. Optionally, up to 15 mole % of the diacid residues may be derived from diacids other than terephthalic and isophthalic, such as succinic, glutaric, adipic, pimelic, suberic, azelic, sebacic, isophthalic, sulfodibenzoic, sulphoisophthalic, maleic, fumaric, 1,4-cyclohexanedicarboxylic (cis-, trans-, or cis/trans mixtures), and the like, or any dicarboxylic acid containing from 4 to about 40 carbon atoms. The polyalkylene diol or polyoxyalkylene diol residues may constitute up to about 80 percent, by weight, of the copolyetheresters. The molecular weight of the poly(oxyalkylene)diol or poly(alkylene)diol can range from about 300 grams per mole up to about 8000 grams per mole. The intrinsic viscosity of the crystallization rate enhancing polymers may range from 0.3 to 1.4 dL/g. Optionally, up to 15 mole percent of the diol residues may be derived from diols other than 1,4-butanediol or a poly(oxyalkylene)diol or poly(alkylene)diol. Examples of other diols which may be used in the preparation of the polyester component include those containing 2 to about 10 carbon atoms such as ethylene glycol, propylene glycol, 1,3-propanediol, 1,6-hexanediol, 1,8-octanediol, neopentyl glycol, 2,2,4,4-tetra-methyl-1,3-cyclobutanediol, diethylene glycol, 1,4-cyclohexanedimethanol (cis, trans, or cis/trans mixtures) and the like. Small amounts, e.g., up to 2 mole percent, of a branching agent such as trimellitic anhydride, pyromellitic dianhydride, glycerol, pentaerythritol, polyvinyl alcohol, styrene-maleic anhydride (SMA) and the like may be included in this polyester if desired. The copolyetherester crystallization rate enhancing polymers may be produced using compositions and techniques similar to those described in U.S. Pat. Nos. 2,623,031, 3,023,192, 3,651,014, 3,763,109, 3,766,146, 3,896,078, 4,013,624, 4,264,761, 4,383,106, and 4,390,687.

Representative polyethers that may be used as "soft segments" in the preparation of the copolyetheresters useful as crystallization rate enhancing polyesters in the present invention are poly(alkylene oxide)diol, such as poly(ethylene oxide)diol, poly(propylene oxide)diol, poly(tetramethylene oxide)diol, poly(pentamethylene oxide)diol, poly(hexamethylene oxide)diol, poly(heptamethylene oxide)diol, and poly(octamethylene oxide)diol. Similarly, dicarboxylic acids of poly(alkylene oxide) such as poly(tetramethylene oxide)dicarboxylic acid, may be used as a portion of the diacid content to replace up to 80 weight percent of the diacid residues. Poly(alkylene)diol may be employed itself as a copolymer with poly(butylene terephthalate) or in combination with poly(oxyalkylene) diols. Poly(alkylene)diols having a molecular weight of about 300 to 8000 may be used, prepared, for example, by the hydrogenation of anionically polymerized functionally terminated poly(butadiene) to produce poly(ethylene-butylene) with hydroxyl terminal groups. An example of this type of material is believed to be the commercial product Kraton L-1203.

Several different types of poly(tetramethylene terephthalate)-based copolyetheresters are commercially available from different manufacturers and may be utilized in the compositions of this invention. DuPont de Nemours & Co. sells suitable polyester elastomers under the trademark Hytrel™, and several grades have been determined to be highly suitable for use as the polyester-based crystallization rate enhancer in the compositions described herein, and these include types 4056, 4556, 5556, 6356, 7246, and 8238. Similarly, poly(tetramethylene terephthalate) suitable for use in this invention is sold by General Electric under the trademark Valox, with a suitable grade being type 310. These examples are intended to be illustrative in nature and not limiting of the scope of the invention. This component of the composition may consist of single components of the composition described, or of blends of poly(tetramethylene terephthalate), poly(tetramethylene terephthalate) copolymerized with poly(oxyalkylene)diol and/or poly(alkylene) diol, poly(tetra-methylene terephthalate/isophthalate), or poly(tetramethylene terephthalate/isophthalate) copolymerized with poly(oxyalkylene)diol and/or poly(alkylene)diol. Any of these embodiments of Component III may be added using procedures well known in the art, such as compounding extrusion, either fed from a separate stream, or precompounded with other additives described in this invention.

The polyester compositions provided by the present invention also may contain one or more additives to improve thermal stability. The presence of one or more additives to improve thermal stability may be desirable when either the polyester composition or tray produced therefrom will experience high temperatures for a significant period of time during processing or in use. Such heat stabilizers typically function through the inhibition of oxidation during exposure to an oxidizing atmosphere at high temperatures. Various types of heat stabilizers may be employed with the most useful for the present invention including alkylated substituted phenols, bisphenols, thiobisacrylates, aromatic amines, organic phosphites, and polyphosphites. Specific aromatic amines which demonstrate heat stabilizing capabilities include primary polyamines, diarylamines, bisdiarylamines, alkylated diarylamines, ketone diarylamine condensation products, and aldehyde imines.

One example of a thermal stabilizer useful in this invention is Irganox 1010 antioxidant (Ciba-Geigy Corporation) which is believed to be a hindered polyphenol stabilizer comprising tetrakis-[methylene3-(3,5-ditert-butyl-4-hydroxyphenyl-propionate)]methane. Another thermal stabilizer that may be used is 1,3,5-trimethyl-2,4,6-tris (3,5-di-t-butyl-4-hydroxybenzyl)benzene. Yet another example is the PEP-Q additive available from Sandoz Chemical, the primary ingredient of which is believed to be tetrakis-(2,4-di-tert-butyl-phenyl)-4,4'biphenyl phosphonite. Other common stabilizer additives include calcium stearate or zinc stearate. Still other stabilizers commonly used include Ultranox 626 antioxidant (General Electric), the primary ingredient of which is believed to be bis(2,4-di-t-butylphenyl) pentaerythritol diphosphite, and Ultranox 627A antioxidant believed to be Ultranox 626 containing about 7 weight percent of a magnesium aluminum hydrocarbonate. Those persons skilled in the art may easily determine the amount of stabilizer that should be added to improve the thermal stability. This amount typically is about 0.001 to about 5 parts per hundred parts of the primary polyester component, i.e., component I.

The novel polyester compositions also may contain one or more additives a which suppress transesterification reactions between the different polyesters of component I and component III. Such transesterification-inhibiting additives commonly are employed for blends of polyesters or copolyesters and polycarbonates, such as is described in U.S. Pat. No. 4,088,709. Blend stabilizers differ in their ability to control blend melt stability and transesterification. Effective stabilizers for polyester/polyester as well as polyester/polycarbonate blends are known in the art and are commercially available. Suitable phosphorus-based transesterification inhibitors that may be present in the polyester compositions of the present invention include, but are not limited, to the following phosphorus compounds:

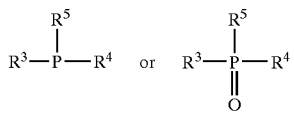

wherein each of $R^3$, $R^4$, and $R^5$ represents a hydrogen atom, an alkyl group containing 1 to 20 carbon atoms, an aryl group containing 6 to 20 carbon atoms, an aralkyl group containing 7 to 20 carbon atoms, or an OR group in which R is a hydrogen atom, an alkyl group containing 1 to 20 carbon atoms, an aryl group containing 6 to 20 carbon atoms, and aralkyl group containing 7 to 20 carbon atoms; $R^3$, $R^4$, and $R^5$ may be different from each other, or at least two of $R^3$, $R^4$, and $R^5$ may be the same, or at least two of $R^3$, $R^4$, and $R^5$ may form a ring, and metal salts of these phosphorous compounds.

Other transesterification inhibitors that may be present include compounds having the structures:

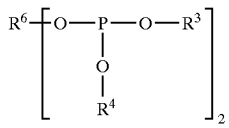

wherein $R^6$ represents a divalent alkyl group having 2–12 carbon atoms or a divalent aryl group having 6–15 carbon atoms; $R^3$ and $R^4$ are monovalent alkyl groups having 2–18 carbon atoms, or a monovalent aryl or substituted aryl group having 6 to 15 carbons;

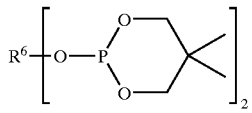

wherein $R^6$ represents a divalent alkyl or poly(alkylene oxide) groups having 2–12 carbon atoms or a divalent aryl or substituted aryl group having 6–15 carbon atoms.

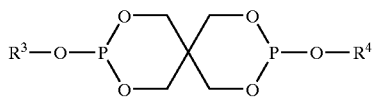

wherein $R^3$ and $R^4$ represent monovalent alkyl groups having 2–18 carbon atoms, or a monovalent aryl or substituted aryl groups having 6–15 carbon atoms.

These phosphorus-containing transesterification inhibitors typically are used in concentrations of about 0.01 to 3 weight percent based on the total weight of the polyester composition. These stabilizers may be used alone or in combination and may be added to either of the component polyesters or to the impact modifier polymer compound before or during the process of forming the polyester compounds of this invention. The suitability of a particular compound for use as a blend stabilizer and the determination of how much is to be used as a blend stabilizer may be readily determined by preparing a mixture of the polyester components and determining the effect on crystallization rate.

Other additives normally used in polyesters such as pigments, colorants, plasticizers, flame retardants, mold release agents, slip agents and the like may be optionally included as desired. Some of these additives may speed crystallization of the polyester compositions from the melt. Glass fibers or other inorganic fillers may also be included.

The polyester compositions of this invention can be prepared by conventional compounding technology, such as the use of single or twin screw extruders. The resultant blends are readily extruded into film or sheeting or injection molded, compression molded or thermoformed into desired shapes or objects.

A particularly preferred embodiment of the invention consists of a polyester composition comprising:

I. about 70 to about 97.5 weight percent of a thermoplastic polyester comprising poly(ethylene terephthalate) having an intrinsic viscosity of about 0.55 to 1.1 dL/g, measured at 25° C. in a solvent consisting of 60 weight percent phenol and 40 weight percent tetrachloroethane;

II. about 2 to about 25 weight percent of an impact modifying polymer comprising one or more ethylene/methyl acrylate/glycidyl methacrylate terpolymers containing about 20 to 35 weight percent methyl acrylate residues and about 2 to 10 weight percent glycidyl methacrylate residues and mixtures of the terpolymers with up to 50 weight percent of an ethylene/methyl acrylate copolymer containing about 20 to 35 weight percent methyl acrylate residues; and III. about 0.5 to about 5 weight percent of a block copolymer of poly(tetramethylene terephthalate) and poly(oxytetramethylene)diol wherein (i) the poly(oxytetra-methylene)diol residue segment has an average molecular weight of about 800 to about 2000 grams per mole, (ii) the poly(oxytetramethylene)diol residue segment constitutes about 10 to 80 weight percent of the block copolymer, and (iii) the block copolymer has an intrinsic viscosity from about 0.25 to about 1.2 dL/g, measured at 25° C. in a solvent consisting of 60 weight percent phenol and 40 weight percent tetrachloroethane. The polyester compositions optionally may contain up to about 5 weight percent, typically from about 0.1 to 1 weight percent, based on the total weight of the polyester composition, of one or more stabilizers or blend of stabilizers consisting of antioxidants and/or phosphorus compounds to prevent the oxidation and/or transesterification of the blend components.

The polyester compositions of the present invention are especially valuable for thermoforming a variety of shaped articles such as food trays or containers for use in the packaging of frozen foods. Thermoforming, as a production method, broadly contemplates the configuration of a plastic sheet into useful articles by heating a preformed sheet of material into a plastic state, allowing the sheet to be formed by conforming to the shape of a mold and then cooling the molded article. Different methods of molding the heated sheet have been developed. For example, the heated sheet may be drawn or forced into the mold by vacuum forming, pressure forming, simultaneous or sequential application of both pressure and vacuum forming, plug assisted vacuum and pressure forming, and matched mold forming, wherein the forming is accomplished by being held between two mold halves mechanically deforming the sheet and holding. In all of these techniques, the heated sheet is held until the part solidifies and may then be removed from the mold. This removal from the mold may be accomplished by air pressure, vacuum or mechanical means, or any combination thereof.

PET is often extruded as an amorphous sheet to be thermoformed to and utilized in a totally, or near totally, amorphous state. PET, by nature of its moderate crystallization rate when unmodified, also may be produced in a semicrystalline form during thermoforming, known in the art as CPET. The transformation of amorphous PET into CPET during formation of molded articles produces advantages in certain properties, such as heat resistance. Many materials that are thermoformed emerge from the process with substantially unchanged properties. In the case of thermoforming CPET, the properties undergo significant change during formation due to crystallization. Thus, several aspects of the production of CPET articles depart substantially from that techniques used in the thermoforming of amorphous PET and other plastic materials.

It has been found desirable that amorphous PET be transformed into CPET having a degree of crystallization between about 20% and 40% by volume. The crystallization process is a function of temperature and time. To accomplish this desired crystallization during a mold cycle, the substantially amorphous PET sheet, typically having a thickness of between about 127 and 3175 microns (5–125 mils), preferably between about 254 and 2032 microns (10 to 80 mils) and most preferably between about 381 and 1016 micron (15 and 40 mils), is first preheated. The temperature of the preheated sheet typically is in the range of about 100 to 180° C., more typically about 125 to 165° C. This softens the sheet and allows it to be shaped in the mold and also brings the sheet into a temperature range where it may begin to crystallize (between its glass transition temperature and melting temperature). A mold heated to a temperature typically between 120 and 180° C. then forms the sheet where it is held at a suitable temperature for a time adequate to develop sufficient crystallinity to produce the desired properties. A major difference between thermoforming amorphous PET and CPET is the solidification process that allows removal of the part from the mold. Amorphous PET solidifies through vitrification of the polymer as it is cooled below its glass transition temperature. CPET is solidified through crystallization, and maintains or substantially maintains its shape even at the high temperatures found in the mold. It is apparent that the speed at which the PET composition employed crystallizes at the process temperature dictates the amount of time the part must spend in the mold before it may be removed, which is a major fraction of the total time required to produce a finished part. Therefore, compositions which crystallize more rapidly (within reasonable limits) at conditions used in thermoforming will reduce the time required to form the part, thus increasing production rates. This improves the economics of the process, and the faster-crystallizing compositions of this invention find part of their utility in this improvement of thermoforming speed.

EXAMPLES

The polyester compositions provided by the present invention and the preparation thereof are further illustrated by the following examples wherein all percentages given are by weight unless otherwise specified and the amounts of materials employed are in parts by weight. Polyester compositions were prepared using the following materials:

Component I—Base Resin:
Poly(ethylene terephthalate) having an intrinsic viscosity of 0.95 dL/g—Versatray PET 12822 from Voridian Company, Division of Eastman Chemical Company (Primary PET);

Component II—Impact Modifier:
Concentrate of a modified ethylene/acrylate polymer in polyethylene terephthalate—CP001C impact modifier concentrate from Voridian Company, Division of Eastman Chemical Company (IM-1);
Ethylene/methyl acrylate copolymer—SP2260 from Voridian Company, Division of Eastman Chemical Company (IM-2);

Component III—Crystallization Rate Enhancer:
Stabilized polyethylene nucleator—E3031-81BA from Voridian Company, Division of Eastman Chemical Company (CRE-1);
Stabilized polypropylene nucleator—G4ZZZ-3BYZ from Voridian Company, Division of Eastman Chemical Company (CRE-2);
Poly(tetramethylene terephthalate) having an intrinsic viscosity of about 1.1 dL/g—Valox 310 from General Electric (CRE-3);
Poly(tetramethylene/polyoxytetramethylene terephthalate)—Hytrel 5556 copolyetherester from DuPont (CRE-4).

The Primary PET and one or more of the materials described above were pellet blended and dried overnight at 150° C. The blended samples were extruded into sheet on a David-Standard 5.1 cm (2 inch) single screw extruder at about 80 revolutions per minute, with an average barrel set-point temperature of about 295° C., through a die held at 270° C. and onto a casting roll operating at 60° C. at a take-up speed of about 2.7 meters (9 feet) per minute. The sheet so obtained was 31.8 cm (12.5 inches) wide by 0.64 mm (0.025 inches) thick. Samples were quickly removed from a representative part of the sheet and stored in a moisture-proof container over a dessicant until testing.

Crystallization kinetics of the various samples were compared by measuring the amount of time required for a sample to reach half of its eventual total crystallinity at a given crystallization temperature (130° C., heated from below the glass transition temperature). Samples were quickly heated from room temperature in a differential scanning calorimeter to the crystallization temperature, which was maintained while the exotherm due to crystallization was monitored until a peak was recorded. The time required to generate this peak was recorded as the crystallization halftime ($t_{1/2}$), which is well-known in the art as a measure of crystallization kinetics. Samples that exhibit a shorter crystallization halftime crystallize more quickly and normally display shorter thermoforming cycle times. The '% change' column of the examples is a comparison of the example material containing impact modifier with the control material containing the same crystallization rate enhancer but no impact modifier. This is calculated by the formula $$\% \text{ change} = \frac{\text{control} \, t_{1/2} - \text{example} \, t_{1/2}}{\text{control} \, t_{1/2}} \times 100$$

A positive % change represents an increase in the crystallization rate over the control material and vice versa.

Reference Examples 1–7

The six polyester compositions described in Reference Examples 1–7 were prepared by extrusion of pellets of unmodified Primary PET or from pellet blends of the Primary PET and one of the above-described Component II materials (impact modifiers—IMs) or one of the Component III materials (crystallization rate enhancers—CREs). The crystallization half-times of the compositions of Reference Examples 1–7 are listed in Table I wherein PET refers to the Primary PET and $t_{1/2}$ is given in seconds measured at 130° C.

TABLE I

| Example No. | Parts PET | CRE | Parts CRE | t½ |
|---|---|---|---|---|
| R-1 | 70.0 | None | — | 235.8 |
| R-2 | 68.0 | CRE-1 | 2.1 | 35.0 |
| R-3 | 68.0 | CRE-2 | 2.1 | 55.2 |
| R-4 | 68.0 | CRE-3 | 2.1 | 60.1 |
| R-5 | 68.0 | CRE-4 | 2.1 | 23.1 |
| R-6 | 63.0 | IM-2 | 7.0 | 154.6 |
| R-7 | 63.0 | IM-1 | 7.0 | 161.3 |

The above reference examples show that the polyethylene-based CRE-1, the polypropylene-based CRE-2, the poly(tetramethylene terephthalate CRE-3 and the Hytrel 5556 CRE-4 speed crystallization of the Primary PET enormously, with Hytrel 5556 showing the greatest improvement. Comparative Examples 6 and 7 show that the addition of impact modifiers (IM-1 and IM-2) alone does improve the crystallization rate, but to a much lesser extent than the CREs.

Example 1 and Comparative Example 1

The two polyester compositions described in Example 1 and Comparative Example 1 were prepared by extrusion of pellet blends of the Primary PET, an impact modifier (IM-2) and a crystallization rate enhancing compound, either CRE-I or CRE-4. The crystallization half-times of the compositions of Example 1 and Comparative Examples 1 are listed in Table II wherein PET refers to the Primary PET, $t_{1/2}$ is given in seconds measured at 130° C., and the % change refers to a decrease or increase (−) in crystallization half-time as compared to similar compositions which do not contain an impact modifier, i.e., the crystallization half-times reported in Examples R-2 and R-5.

The results reported in Table II establish that that the addition of the impact modifying additive slows the crystallization rate of the sample with polyethylene CRE-1added. In contrast, the addition of the impact modifying additive to the sample containing the Hytrel copolyetherester CRE-4 exhibits an increase in crystallization rate due to the presence of the impact modifier as shown by the negative and positive % change from the controls without impact modifier shown in Example 1. Samples of the material of Example 1 were thermoformed into trays displaying fast cycle time and good resistance to impact.

TABLE II

| Example No. | Parts PET | IM | Parts IM | CRE | Parts CRE | t½ | % Change |
|---|---|---|---|---|---|---|---|
| 1 | 60.9 | IM-2 | 7.0 | CRE-4 | 2.1 | 14.5 | 37.2 |
| C-1 | 60.9 | IM-2 | 7.0 | CRE-1 | 2.1 | 49.7 | −42.0 |
| R-2 | 68.0 | — | — | CRE-1 | 2.1 | 35.0 | — |
| R-5 | 68.0 | — | — | CRE-4 | 2.1 | 23.1 | — |

IM-2 = ethylene/methyl acrylate copolymer SP2260
CRE-1 = stabilized polyethylene nucleator E3031-81BA
CRE-4 = poly(tetramethylene/polyoxytetramethylene terephthalate) Hytrel 5556

Example 2 and Comparative Example 2

The two polyester compositions described in Example 2 and Comparative Example 2 were prepared by extrusion of pellet blends of the Primary PET, an impact modifier (IM-1) and a crystallization rate enhancing compound, either CRE-I or CRE-4. The crystallization half-times of the compositions of Example 2 and Comparative Examples 2 are presented in Table III wherein PET refers to the Primary PET, $t_{1/2}$ is given in seconds measured at 130° C., and the % change refers to a decrease or increase (−) in crystallization half-time as compared to similar compositions which do not contain an impact modifier, i.e., the crystallization half-times reported in Examples R-2 and R-5. The results reported in Table III again show the superiority of the Hytrel copolyetherester CRE-4 together with the impact modifier in increasing the crystallization rate of the polyester composition. Samples of the material of Example 2 were thermoformed into trays displaying fast cycle time and good resistance to impact.

TABLE III

| Example No. | Parts PET | IM | Parts IM | CRE | Parts CRE | t½ | % Change |
|---|---|---|---|---|---|---|---|
| 2 | 46.7 | IM-1 | 21.2 | CRE-4 | 2.1 | 15.6 | 32.5 |
| C-2 | 46.7 | IM-1 | 21.2 | CRE-1 | 2.1 | 49.9 | −42.6 |
| R-2 | 68.0 | — | — | CRE-1 | 2.1 | 35.0 | — |
| R-5 | 68.0 | — | — | CRE-4 | 2.1 | 23.1 | — |

IM-1 = modified ethylene/acrylate copolymer in poly(ethylene terephthalate CP0001C
CRE-1 = stabilized polyethylene nucleator E3031-81BA
CRE-4 = poly(tetramethylene/polyoxytetramethylene terephthalate) Hytrel 5556

Example 3 and Comparative Example 3

The two polyester compositions described in Example 3 and Comparative Example 3 were prepared by extrusion of pellet blends of the Primary PET, an impact modifier (IM-1) and a crystallization rate enhancing compound, either CRE-2 or CRE-4. The crystallization half-times of the compositions of Example 3 and Comparative Examples 3 are presented in Table IV wherein PET, $t_{1/2}$, and the % Change having the meanings given above. The results reported in Table IV again show the superiority of the Hytrel copolyetherester CRE-4 together with the impact modifier in increasing the crystallization rate of the polyester composition. Samples of the material of Example 3 were thermoformed into trays displaying fast cycle time and good resistance to impact.

TABLE IV

| Example No. | Parts PET | IM | Parts IM | CRE | Parts CRE | t½ | % Change |
|---|---|---|---|---|---|---|---|
| 3 | 46.7 | IM-1 | 21.2 | CRE-4 | 2.1 | 15.6 | 32.5 |
| C-3 | 46.7 | IM-1 | 21.2 | CRE-2 | 2.1 | 49.9 | −42.6 |
| R-3 | 68.0 | — | — | CRE-2 | 2.1 | 55.2 | — |
| R-5 | 68.0 | — | — | CRE-4 | 2.1 | 23.1 | — |

IM-1 = modified ethylene/acrylate copolymer in poly(ethylene terephthalate CP001C
CRE-2 = stabilized polypropylene nucleator GAZZZ-3BYZ
CRE-4 = poly(tetramethylene/polyoxytetramethylene terephthalate) Hytrel 5556

Example 4 and Comparative Example 4

The two polyester compositions described in Example 4 and Comparative Example 4 were prepared by extrusion of pellet blends of the Primary PET, an impact modifier (IM-2) and a crystallization rate enhancing compound, either CRE-1 or CRE-3. The crystallization half-times of the compositions of Example 4 and Comparative Examples 4 are presented in Table V wherein PET, $t_{1/2}$, and the % Change having the meanings given above. The results reported in Table V demonstrate the superiority of the poly(tetramethylene terephthalate) CRE-3 together with the impact modifier in increasing the crystallization rate of the polyester composition when compared to the polyethylene CRE-1. Samples of the material of Example 4 were thermoformed into trays displaying fast cycle time and good resistance to impact.

TABLE V

| Example No. | Parts PET | IM | Parts IM | CRE | Parts CRE | t½ | % Change |
|---|---|---|---|---|---|---|---|
| 4 | 60.9 | IM-2 | 7.0 | CRE-3 | 2.1 | 12.1 | 79.9 |
| C-4 | 60.9 | IM-2 | 7.0 | CRE-1 | 2.1 | 49.7 | −42.0 |
| R-2 | 68.0 | — | — | CRE-1 | 2.1 | 35.0 | — |
| R-4 | 68.0 | — | — | CRE-3 | 2.1 | 60.1 | — |

IM-2 = ethylene/methyl acrylate copolymer SP2260
CRE-1 = stabilized polyethylene nucleator E3031-81BA
CRE-3 = poly(tetramethylene terephthalate) Valox 310

The invention has been described in detail with particular reference to preferred embodiments thereof, but it will be understood that variations and modifications can be effected within the spirit and scope of the invention.

I claim:

1. A polyester composition comprising:
   I. about 70 to about 97.5 weight percent of a thermoplastic polyester comprising poly(ethylene terephthalate) having an intrinsic viscosity of about 0.55 to 1.1 dL/g, measured at 25° C. in a solvent consisting of 60 weight percent phenol and 40 weight percent tetrachloroethane;
   II. about 2 to about 25 weight percent of an impact modifying polymer comprising one or more ethylene/methyl acrylate/glycidyl methacrylate terpolymers containing about 20 to 35 weight percent methyl acrylate residues and about 2 to 10 weight percent glycidyl methacrylate residues and mixtures of the terpolymers with up to 50 weight percent of an ethylene/methyl acrylate copolymer containing about 20 to 35 weight percent methyl acrylate residues; and
   III. about 0.5 to about 5 weight percent of a block copolymer of poly(tetramethylene terephthalate) and poly(oxytetramethylene)diol wherein
      (i) the poly(oxytetramethylene)diol residue segment has an average molecular weight of about 800 to about 2000 gram per mole,
      (ii) the poly(oxytetramethylene)diol residue segment constitute about 10 to 80 weight percent of the block copolymers, and
      (iii) the block copolymer has an intrinsic viscosity from about 0.25 to about 1.2 dL/g, measured at 25° C. in a solvent consisting of 60 weight percent phenol and 40 weight percent tetrachloroethane;
   wherein the weight percentages of I, II and III are based on the total weight of components I, II and III.

2. A polyester composition according to claim 1 wherein component II comprises a terpolymer of ethylene, methyl acrylate and GMA containing about 20 to 35 weight percent methylacrylate and about 2 to 10 weight percent GMA residues and component II constitutes about 10 to 25 weight percent, based on the total weight of components I, II and III.

3. A polyester composition according to claim 2 which includes a transesterification inhibitor.

4. The composition of claim 2 which includes about 0.01 to 3 weight percent, based on the total weight of the composition, of a transesterification inhibitor selected from the compounds having the formulas:

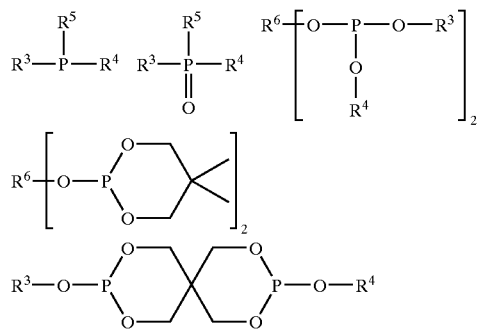

wherein each of $R^3$, $R^4$, and $R^5$ represents a hydrogen atom, an alkyl group containing 1 to 20 carbon atoms, an aryl group containing 6 to 20 carbon atoms, an aralkyl group containing 7 to 20 carbon atoms, or an OR group in which R is a hydrogen atom, an alkyl group containing 1 to 20 carbon atoms, an aryl group containing 6 to 20 carbon atoms, and aralkyl group containing 7 to 20 carbon atoms; $R^3$, $R^4$, and $R^5$ may be different from each other, or at least two of $R^3$, $R^4$, and $R^5$ may be the same, or at least two of $R^3$, $R^4$, and $R^5$ may form a ring; $R^6$ represents a divalent alkyl group having 2–12 carbon atoms or a divalent aryl group having 6–15 carbon atoms; and metal salts thereof.

5. A polyester composition comprising:
   I. about 70 to about 97.5 weight percent of a thermoplastic polyestar comprising poly(ethylene terephthalate) having an intrinsic viscosity of about 0.55 to 1.1 dL/g, measured at 25° C. in a solvent consisting of 60 weight percent phenol and 40 weight percent tetrachloroethane;
   II. about 2 to about 25 weight percent of an impact modifying polymer mixture comprising
      (i) a copolymer of ethylene and methyl acrylate containing about 20 to 35 weight percent methyl acrylate residues and
      (ii) a copolymer of ethylene and glycidyl methacrylate terpolymers containing about 2 to 10 weight percent glycidyl methacrylate residues; and
   III. about 0.5 to about 5 weight percent of a block copolymer of poly(tetramethylene terephthalate) and poly(oxytetramethylene)diol wherein
      (i) the poly(oxytetramethylene)diol residue segment has an average molecular weight of about 800 to about 2000 grams per mole,
      (ii) the poly(oxytetramethylene)diol residue segment constitutes about 10 to 80 weight percent of the block copolymer, and
      (iii) the block polymer has an intrinsic viscosity from about 0.25 to about 1.2 dL/g, measured at 25° C. in a solvent consisting of 60 weight percent phenol and 40 weight percent tetrachloroethane;
   wherein the weight percentages of I, II and III are based on the total weight of components I, II and III.

6. A polyester composition according to claim 5 which includes a transesterification inhibitor.

7. The composition of claim 5 which includes about 0.01 to 3 weight percent, based on the total weight of the composition, of a transesterification inhibitor selected from the compounds having the formulas:

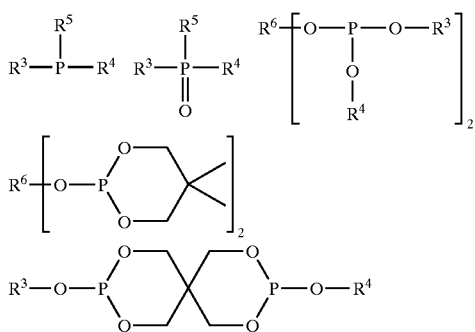

wherein each of $R^3$, $R^4$, and $R^6$ represents a hydrogen atom, an alkyl group containing 1 to 20 carbon atoms, an aryl group containing 6 to 20 carbon atoms, an aralkyl group containing 7 to 20 carbon atoms, or an OR group in which R is a hydrogen atom, an alkyl group containing 1 to 20 carbon atoms, an aryl group containing 6 to 20 carbon atoms, and aralkyl group containing 7 to 20 carbon atoms; $R^3$, $R^4$, and $R^5$ may be different from each other, or at least two of $R^3$, $R^4$, and $R^5$ may be the same, or at least two of $R^3$, $R^4$, and $R^5$ may form a ring; $R^6$ represents a divalent alkyl group having 2–12 carbon atoms or a divalent aryl group having 6–15 carbon atoms; and metal salts thereof.

8. A method for the manufacture of a shaped article by the thermoforming method which comprises the steps of:
   I. Providing a sheet of the polyester composition of claim 1 having a temperature of about 125°–165° C.;
   II. Positioning the sheet of step (1) over the opening of a mold having a surface temperature of about 120°–180° C.;
   III. causing the sheet of step (1) to conform to the shape of the old to form a shaped article;
   IV. retaining the shaped article within the mold to induce crystallization of the polyester composition; and
   V. removing the shaped article from the mold.

9. A method for the manufacture of a shaped article by the thermoforming method which comprises the steps of:
   I. Providing a sheet of the polyester composition of claim 5 having a temperature of about 125°–165° C.;
   II. Positioning the sheet of step (1) over the opening of a mold having a surface temperature of about 120°–180° C.;
   III. causing the sheet of step (1) to conform to the shape of the mold to form a shaped article;
   IV. retaining the shaped article within the mold to induce crystallization of the polyester composition; and
   V. removing the shaped article from the mold.

* * * * *

UNITED STATES PATENT AND TRADEMARK OFFICE
CERTIFICATE OF CORRECTION

PATENT NO. : 6,986,864 B2
DATED : January 17, 2006
INVENTOR(S) : Porter

It is certified that error appears in the above-identified patent and that said Letters Patent is hereby corrected as shown below:

Column 19,
Line 59, "component II" should be -- component --.

Column 20,
Line 55, "block polymer" should be -- block copolymer --.

Column 22,
Line 9, "old" should be -- mold --.

Signed and Sealed this

Fourth Day of April, 2006

JON W. DUDAS
*Director of the United States Patent and Trademark Office*